(12) United States Patent
Klein-Hitpass et al.

(10) Patent No.: US 9,920,830 B2
(45) Date of Patent: Mar. 20, 2018

(54) SLIDING BEARING FOR PLANET CARRIER

(71) Applicant: Siemens Aktiengesellschaft, München (DE)

(72) Inventors: Arno Klein-Hitpass, Aachen (DE); Joachim Rohde, Aachen (DE); Boris Trogrlic, Aachen (DE)

(73) Assignee: FLENDER GMBH, Bocholt (DE)

( * ) Notice: Subject to any disclaimer, the term of this patent is extended or adjusted under 35 U.S.C. 154(b) by 0 days.

(21) Appl. No.: 15/327,264

(22) PCT Filed: Jul. 2, 2015

(86) PCT No.: PCT/EP2015/065135
§ 371 (c)(1),
(2) Date: Jan. 18, 2017

(87) PCT Pub. No.: WO2016/008737
PCT Pub. Date: Jan. 21, 2016

(65) Prior Publication Data
US 2017/0175878 A1 Jun. 22, 2017

(30) Foreign Application Priority Data

Jul. 18, 2014 (EP) .................................. 14177658

(51) Int. Cl.
*F16H 57/08* (2006.01)
*F16C 33/04* (2006.01)
(Continued)

(52) U.S. Cl.
CPC ........... *F16H 57/082* (2013.01); *F03D 15/00* (2016.05); *F16C 17/02* (2013.01); *F16C 33/046* (2013.01);
(Continued)

(58) Field of Classification Search
None
See application file for complete search history.

(56) References Cited

U.S. PATENT DOCUMENTS 4,268,094 A * 5/1981 Greene .................. F16C 17/03
384/107
5,679,087 A * 10/1997 Lutz ........................ B60K 1/02
475/149
(Continued)

FOREIGN PATENT DOCUMENTS

DE 10260132 A1 7/2004
DE 102007042770 A1 * 3/2009 ............ F16C 19/386
(Continued)

*Primary Examiner* — Justin Holmes
(74) *Attorney, Agent, or Firm* — Henry M. Feiereisen LLC

(57) ABSTRACT

A planetary gearbox includes a gearbox housing, a sunwheel rotatable in the housing about a central gearbox axis and having outer teeth, a ringwheel arranged concentrically to the central gearbox axis within the housing and having inner teeth, a planet gear carrier rotatable in the gearbox housing about the central gearbox axis, and a plurality of planet gears mounted on the planet gear carrier for rotation about corresponding planetary gear pins and having outer teeth meshing with the inner teeth on the ringwheel and the outer teeth of the sunwheel. At least one segmented radial sliding bearing supports the planet gear carrier on the gearbox housing and includes a plurality of circumferentially spaced-apart radial sliding bearing segments positioned radially outside the planetary gear pins so that the planet gear carrier is supported by the radial sliding bearing at a position located radially outside the planetary gear pins.

22 Claims, 5 Drawing Sheets

(51) Int. Cl.
*F16C 17/02* (2006.01)
*F03D 15/00* (2016.01)
*F16C 35/02* (2006.01)
*F16H 1/28* (2006.01)
*F16H 57/02* (2012.01)

(52) U.S. Cl.
CPC .............. *F16C 35/02* (2013.01); *F16H 1/28* (2013.01); *F16H 57/02* (2013.01); *F05B 2260/40311* (2013.01); *F16C 2360/31* (2013.01); *F16C 2361/61* (2013.01); *Y02E 10/722* (2013.01)

(56) References Cited

U.S. PATENT DOCUMENTS

| | | | |
|---|---|---|---|
| 8,378,536 B2 * | 2/2013 | Potter | B02C 15/006 310/43 |
| 8,591,368 B2 | 11/2013 | Dinter et al. | |
| 8,591,371 B2 | 11/2013 | Dinter et al. | |
| 8,621,940 B2 | 1/2014 | Klein-Hitpass et al. | |
| 8,632,437 B2 | 1/2014 | Dinter et al. | |
| 8,784,252 B2 | 7/2014 | Dinter et al. | |
| 9,051,922 B2 | 6/2015 | Böing et al. | |
| 9,151,275 B2 | 10/2015 | Dinter et al. | |
| 9,267,864 B2 | 2/2016 | Klein-Hitpass et al. | |
| 2010/0098564 A1 * | 4/2010 | Parmeter | F16C 17/03 417/423.3 |
| 2013/0028731 A1 * | 1/2013 | Mimura | F16C 17/03 415/229 |
| 2014/0083172 A1 | 3/2014 | Rohde et al. | |
| 2015/0142175 A1 | 5/2015 | Reimers et al. | |
| 2015/0239076 A1 | 8/2015 | Klein-Hitpass et al. | |
| 2015/0244168 A1 | 8/2015 | Reimers et al. | |

FOREIGN PATENT DOCUMENTS

| | | |
|---|---|---|
| DE | 102010019535 A1 | 11/2011 |
| EP | 2302257 A2 | 3/2011 |
| EP | 2479458 A1 | 7/2012 |
| WO | WO 2013106879 A1 | 7/2013 |

* cited by examiner

SLIDING BEARING FOR PLANET CARRIER

CROSS-REFERENCES TO RELATED APPLICATIONS

This application is the U.S. National Stage of International Application No. PCT/EP2015/065135, filed Jul. 2, 2015, which designated the United States and has been published as International Publication No. WO 2016/008737 A1 which claims the priority of European Patent Application, Serial No. 14177658.3, filed Jul. 18, 2014, pursuant to 35 U.S.C. 119(a)-(d).

BACKGROUND OF THE INVENTION

The present invention relates to a planetary gearbox, in particular for a wind turbine, with a gearbox housing, a central sunwheel which is mounted in the gearbox housing so that it can rotate about a central gearbox axis and has teeth on its outer side, a ringwheel which is arranged concentrically to the central gearbox axis within the gearbox housing and has teeth on its inner side, a planet gear carrier which is mounted in the gearbox housing so that it can rotate about the central gearbox axis, and several planet gears which are mounted by planet gear bearings on the planet gear carrier so that they can turn about planetary gear pins and which have teeth on their outer sides, these being meshed with the inner teeth of the ring gear and the outer teeth of the sunwheel.

Externally, there is hardly any difference between modern wind turbines. The differences lie essentially in the arrangement of the drives, which are provided between the rotor and the generator for the purpose of converting the low rotational speed of the rotor hub into a higher rotational speed for the generator. For large turbines, conversion ratios of 1:100 are usual. In order to realize such large conversion ratios, use is generally made of multi-stage gearboxes. Here, the preference in the current drive concepts is for a combination of planetary gear stages and spur gear stages, wherein in the first, high-torque, gearbox stages use is often made of obliquely toothed planetary gears for a compact construction, while in the subsequent high-power stages use is made of an obliquely toothed spur gear gearbox.

Here, the rotor shaft or rotor hub, as applicable, is joined to the planetary gear carrier of the first stage. This has bearing mounts in the gearbox housing at two positions on axially opposite sides of the planetary gears—i.e. on the drive input side and on the drive offtake side of the gearbox stage—and drives the planetary gears. Alternatively, a one-side bearing mount is also possible. The ringwheel/ring gear has a fixed joint to the gearbox housing, so that the result is a circulatory movement of the planet gears in the gearbox. The torque is transmitted from the planet gears to the sunwheel/sun gear, which is joined to the planet gear carrier of the second stage by a splined shaft. The action of the second planetary stage is identical to the first stage. In the last gearbox stage the spur gear, which is driven by the sun gear of the second stage, effects a further conversion, so that a conversion takes place from an initially small rate of rotation of the rotor shaft with a high torque to a high rate of rotation of the generator shaft with a low torque.

In the case of conventional planetary gearboxes, and planet-spur-gear gearboxes for wind turbines, use is mainly made of roller bearings for the bearing mounts of the planet gears in the planet gear carrier and also the planet gear carrier in the gearbox housing.

Occasionally, use is also made of hydrodynamically operating sliding bearings. EP 2 302 257 A2 discloses, for example, a planetary gearbox of the type cited in the introduction with a gearbox housing and a central sunwheel, which is mounted in the gearbox housing so that it can rotate about a central gearbox axis, and has external teeth. Further, a ringwheel is provided which is arranged in the gearbox housing concentrically with the central gearbox axis, and which has internal teeth. Also provided is a planet gear carrier, which has a bearing mounting in the gearbox housing so that it can rotate about the central gearbox axis. On the planet gear carrier are several planet gears, which have planet gear bearing mountings so that they can rotate about planetary gear wirier pins. The planet gears have external teeth, which mesh with the internal teeth on the ringwheel and the external teeth on the sunwheel. In this planetary gearbox, the planet gear carrier is supported on the gearbox housing by radial sliding bearings.

Known materials for sliding bearings, which are used for sliding bearings, are for example bearing metal with alloying components and bronze alloys. In general, sliding bearings for industrial applications are arranged with a lubrication groove of about 15 to 20 µm relative to the diameter at the operating point. For bearing metal, the permissible mean dynamic pressure specified by bearing manufacturers is at least 5 MPa.

However, the use of sliding bearings is relatively rare. The reasons for this are the unstable operating conditions which predominate in many cases, and temporary exceptionally low sliding speeds at the same time as extreme loading on the sliding bearing. Conventional sliding bearings are mainly used when the application conditions involve high to very high rotational speeds. For these reasons it is usual to use almost exclusively roller bearings for bearing sites in wind turbines.

Regardless of whether roller bearings or sliding bearings are used, the attempt is made to avoid mixed friction in operation by lubrication measures, and in this way to keep the wear at the bearing sites as low as possible. However, the measures which must be taken for lubrication and cooling of the drive components, in particular in the region of the bearing sites, are very costly. Apart from this, in spite of all countermeasures all the bearing sites are subject to slight wear, because of the high loadings and the low rotational speeds involved about its own axle for the rotor of a wind turbine, because they regularly operate in the region of mixed friction. The abrasion from the gears, which is present and has not yet been filtered out, accelerates yet more the wear at the contact surfaces and thus limits the service life of the bearing sites.

SUMMARY OF THE INVENTION

It is thus the object of the invention to structure a planetary gearbox, in particular for wind turbines, in such a way that the servicing and/or maintenance is simplified.

This object is achieved for a planetary gearbox of the type mentioned in the introduction in that the planet gear carrier is supported on the gearbox housing by at least one segmented radial sliding bearing which incorporates several radial sliding bearing segments which are arranged so that they are spaced apart from each other in the circumferential direction, wherein the radial sliding bearing segments are positioned radially outside the planetary gear pins, so that the planet gear carrier is supported by the radial sliding bearing at positions which lie radially outside the planetary gear pins.

The underlying consideration on which the invention is based is thus to use segmented radial sliding bearings, the segments of which can be easily replaced without the need to dismantle and/or dismount the planetary gearbox. To this end, the radial sliding bearing consists of several, in particular of three, separate radial sliding bearing segments which are spaced apart in the circumferential direction, which support the planet gear carrier as far out as possible. Specifically, provision is inventively made that the segmented radial sliding bearing, and hence the radial sliding bearing segments, support the planet gear carrier radially outside the planetary gear pins. In other words, the planet gear carrier is supported by the radial sliding bearing segments at positions which lie radially outside a circle which is defined by the radially outermost points of the planetary gear pins.

It is preferable that the radial sliding bearing segments support the plant gear carrier in the region of it outermost diameter. Moving the position of the bearing for the radial sliding bearing outwards, and its divided construction, creates the possibility of replacing worn bearings. Also, the possibility is opened up in principle for post-adjustment in the radial direction, if necessary, of the individual separate radial sliding bearing segments, in order to balance out bearing wear.

In principle, the planet gear carrier can be supported on the gearbox housing by segmented radial sliding bearings on both sides of the planet gears. However, in accordance with the invention, only one bearing, and here in particular the bearing lying on the drive offtake side of the planetary gearbox, needs to be positioned radially outside the planet gear axes. The other segmented radial sliding bearing can also lie outside, but can also be provided in a position which is located radially further inwards.

In accordance with one form of embodiment of the invention, provision is made that the planet gear carrier has its bearing mount on the gearbox housing on axially oppositely located sides of the planet gears, and on the drive offtake side of the planetary gearbox is supported on the gearbox housing radially outside the planetary gear pins by a segmented radial sliding bearing.

The radial sliding bearing segments of the radial sliding bearing are expediently mounted on the outer side of the gearbox housing, wherein they protrude through radial or axial through-holes in the gearbox housing, so that their inner surfaces land on the planet gear carrier. This form of embodiment opens up the possibility of mounting the radial sliding bearing segments on the gearbox housing from outside it, so that they are easily accessible. There is also the possibility of making an adjustment from outside, in particular in the radial direction, to the position of the radial sliding bearing segments. For example, by using washers it is possible in a simple way to alter the radial position of the radial sliding bearing segments. It is also possible to provide other adjustment facilities for setting the (radial) position of the radial sliding bearing segments.

In accordance with one preferred form of embodiment of the invention, provision is made that each of the radial sliding bearing segments is mounted on the radially inner side of an associated carrier plate which is mounted, in particular is rigidly bolted, onto the outer side of the gearbox housing. Sealing plates can then be provided between the carrier plates and the associated radial sliding bearing segments.

As a further development of the invention, the radial sliding bearing segments can be provided on a component of the gearbox housing constructed as a torque brace, i.e. on the component via which the drive is connected to the main platform of the wind turbine, in order to prevent rotation of the gearbox due to the driving torque.

In principle, it is possible to construct and/or position the radial sliding bearing segments so that they also support the planet gear carrier axially relative to the gearbox housing. However, it is preferable that the axial support is effected by separate axial sliding bearings. In accordance with one preferred form of embodiment of the invention, provision is then made that a ring insert is inserted from the drive offtake side of the planetary gearbox into the gearbox housing, in particular into the component of the gearbox housing which is constructed as a torque brace, and the planet gear carrier is supported against the ring insert, in particular against a limb of the ring insert which projects radially outwards, by an axial sliding bearing. Here, the axial sliding bearing can be constructed as a slip ring. On the drive input side of the planetary gearbox, the planet gear carrier can be supported by a segmented radial sliding bearing which is mounted on a flange on the gearbox housing. The radial sliding segments can here be fixed in the manner already described, directly or via sealing elements, onto carrier plates which are mounted, in particular rigidly bolted, onto the gearbox housing. Further, the planet gear carrier can be supported on the gearbox housing on the drive input side of the planetary gearbox by an axial sliding bearing, in particular an axial slip ring. This can be held on a ring element which is inserted into the gearbox housing, in particular into the cover of the gearbox housing.

In the region of their sliding surfaces, the radial or axial sliding bearings, as applicable, consist of suitable sliding bearing materials, such as are known per se. In particular, use can be made of copper-zinc alloys or copper-tin alloys. Here, use will preferably be made of copper-zinc alloys with a zinc content of between 6% and 40%, or copper-tin alloys with a tin content of between 4% and 12%. Also conceivable are aluminum-tin alloys, in which case these will preferably have a tin content of between 6% and 40%. The sliding bearing material can be roll-bonded onto the carrier plate. It is equally possible to provide a PVD coating on the sliding surfaces of the sliding bearings which are used. It is expedient if the sliding bearing also has in a topmost coating layer a synthetic inflow layer.

BRIEF DESCRIPTION OF THE DRAWING

Below, an exemplary embodiment of the invention is described by reference to the attached drawing. The drawing shows.

DETAILED DESCRIPTION OF THE EMBODIMENTS

Figure 1:
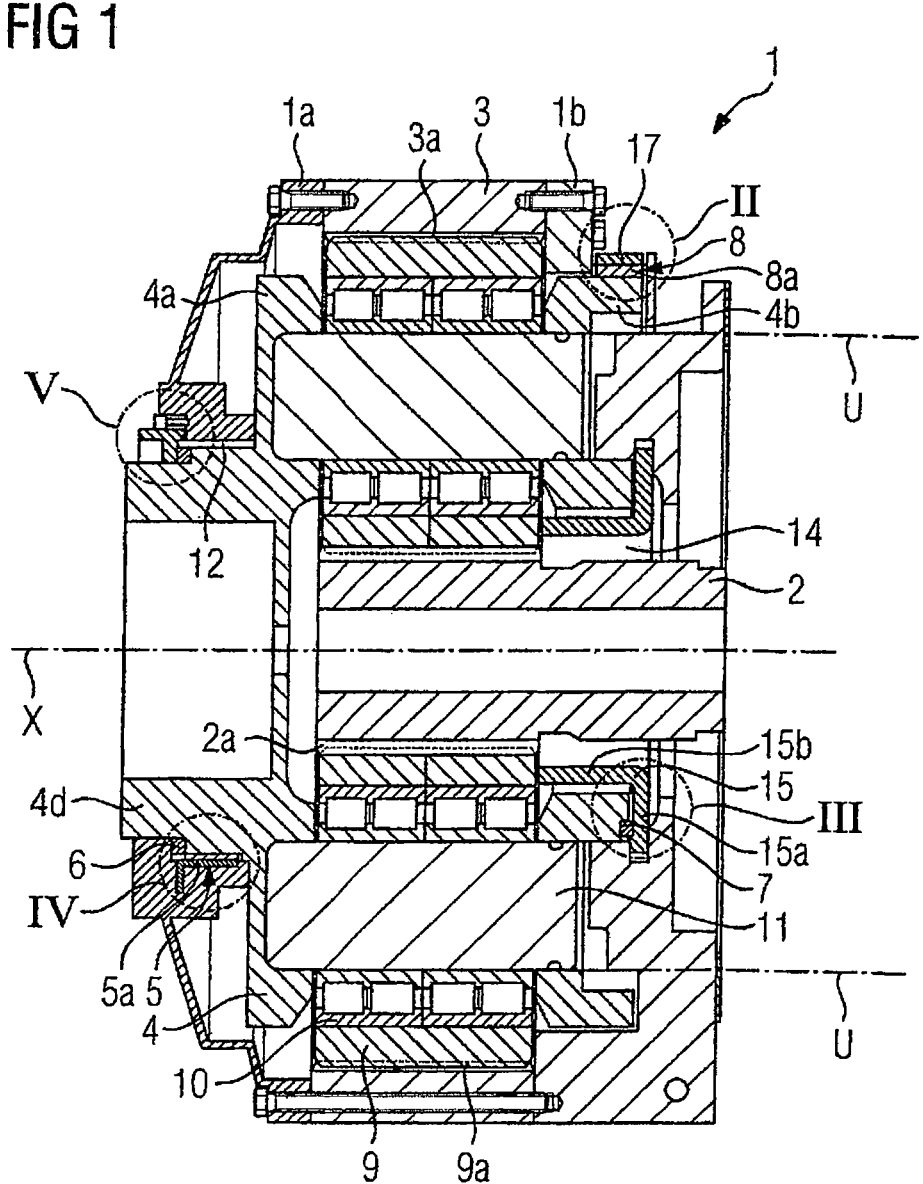
FIG. 1 a schematic view of a form of embodiment of a planetary gearbox in accordance with the invention, FIG. 2 an enlarged view of the section A in FIG. 1, FIG. 3 an enlarged view of the section B in FIG. 1, FIG. 4 an enlarged view of the section C in FIG. 1
Figure 2:
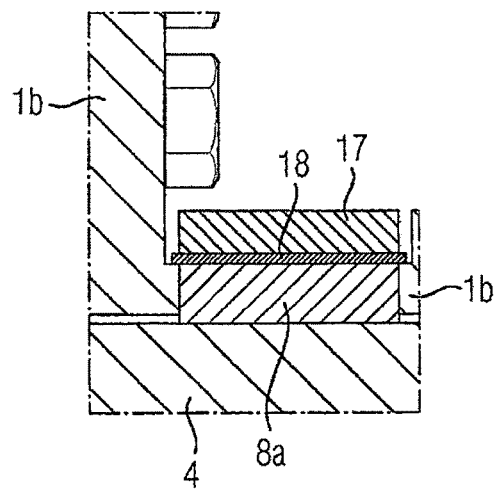
Figure 3:
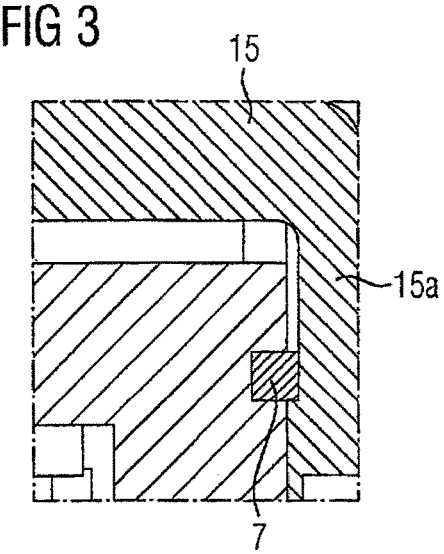
Figure 4:
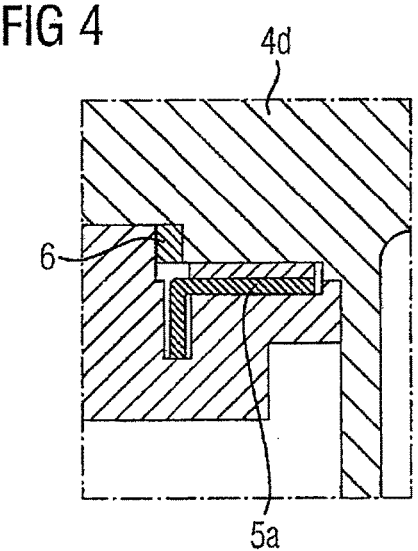
Figure 5:
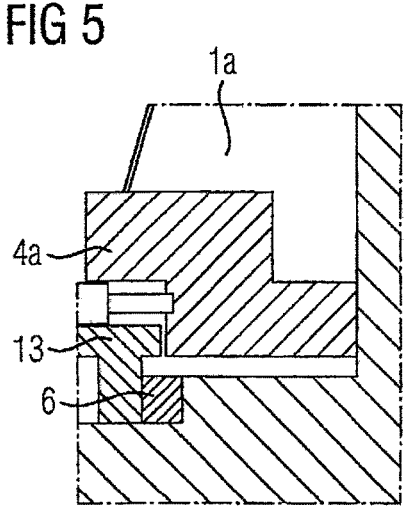
FIG. 5 an enlarged view of the section D in FIG. 1.
Figure 6:
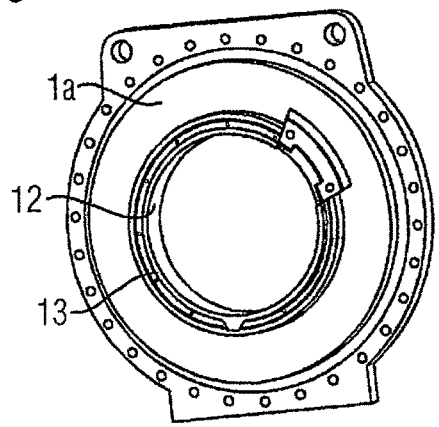
FIG. 6 a frontal view of a cover which forms the housing on the drive input side of the planetary gearbox in FIG. 1, FIG. 7 rear view of the flange in FIG. 6, FIG. 8 a radial sliding bearing segment with a retaining plate, FIG. 9 a ring element for retaining an axial sliding bearing, FIG. 10 a torque brace which forms that part of the gearbox housing on the drive offtake side of the planetary gearbox in FIG. 1, FIG. 11 a ring insert for the torque brace in FIG. 10, FIG. 12 a radial sliding bearing segment for use with the torque brace in FIG. 10, and FIG. 13 an exemplary embodiment of an adjustment facility to adjust a radial position of radial sliding bearing segment.

FIG. 1 shows a conversion stage of a planetary gearbox in accordance with one form of embodiment of the present invention, which is arranged on the tower of a wind turbine, not shown, and which serves to drive a generator by a rotor of the wind turbine which has several blades, and in doing so converts the low rate of rotation of the rotor shaft or the rotor hub, as applicable, to a high rate of rotation of the generator shaft. The planetary gearbox incorporates a gearbox housing 1, in which is a planetary stage as a first conversion stage, which is followed by further conversion stages, not shown in the drawing, which can be constructed in the form of spur or planetary gear stages. The first planetary stage of the planetary gearbox which is shown incorporates a central sunwheel (sun gear) 2 which is mounted in the gearbox housing 1 so that it can rotate about a central gearbox axis X and has teeth 2a on its outer side. Also part of the planetary gearbox is a ringwheel (ring gear) 3, which has a fixed arrangement, concentric with the central gearbox axis X and has teeth 3a on its inner circumference.

In addition, the planetary gearbox incorporates a planet gear carrier 4. This is supported in the gearbox housing 1 on radial and axial sliding bearings 5, 6, 7, 8 so that it can rotate about the gearbox axis X and is axially supported, and consists of two parallel side faces 4a, 4b which are joined to each other by webs, not shown here. Finally, the planetary gearbox has several planet wheels (gears) 9 which are mounted on the planted gear carrier 4 on planet gear bearings, so that they can rotate, and have external teeth 9a which mesh with the internal teeth 3a on the ring gear 3 and the external teeth 2a on the sun gear. In this exemplary embodiment a total of four planet gears 9 are provided, arranged with an offset of 90 degrees to each other and supported by the corresponding planet gear bearings 10 so that they can rotate on planetary gear pins 11 which are aligned parallel to the central gearbox axis X and extend between the faces 4a, 4b of the planet gear carrier 4. The planet gear carrier 4 has in addition a linking section 4d which is constructed as a hollow shaft, by which the planet gear carrier 4 is or can be connected to the rotor shaft of the rotor.

Figure 7:
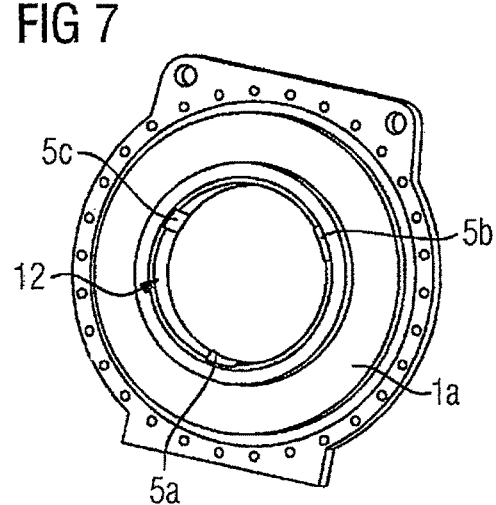
Figure 8:
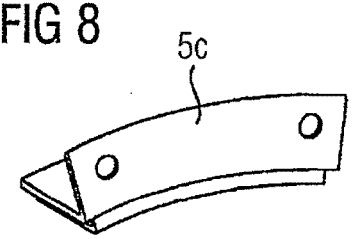
Figure 9:
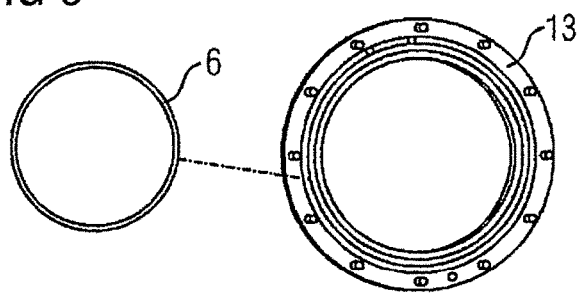

In the exemplary embodiment illustrated, the gearbox housing 1 incorporates two housing parts 1a, 1b, between which the ring gear 3 is positioned, and to which the ring gear 3 is rigidly joined. Provided on the drive side of the planetary gearbox, facing towards the rotor, is a housing part in the form of a cover 1a, which is joined to the ring gear 3 and has a central through-hole 12 for the hollow shaft 4d of the planet gear carrier 4. As can be seen, in particular from FIGS. 7 and 8, in the region of the through-hole 12 three radial sliding bearing segments 5a, 5b, 5c are attached, regularly distributed and spaced from each other around the inner perimeter of the cover 1a, which define a segmented radial sliding bearing 5 by which, on the drive input side of the planetary gearbox, the planet gear carrier 4 is radially supported and is mounted on the gearbox housing 1 so that it can rotate. Each of the radial sliding bearing segments 5a, 5b, 5c has an L-shaped cross-section, wherein one limb of the L lies against the outer face of the cover 1a and is bolted to it, and the other limb of the L defines a radial sliding surface and is made of an appropriate sliding material. What cannot be seen in the drawing is that each of the radial sliding bearing segments 5a, 5b, 5c, is provided on a carrier plate, via which they are also bolted to the cover. This construction is further described below by reference to the radial sliding bearing segments 8a, 8b, 8c of the other radial sliding bearing 8. The planet gear carrier 4 is further supported on the gearbox housing 1 on the drive input side by an axial sliding bearing 6, here an axial slipring. The axial slipring 6 is held on a ring element 13, which is held on the inner side of the cover 1a.

Figure 10:
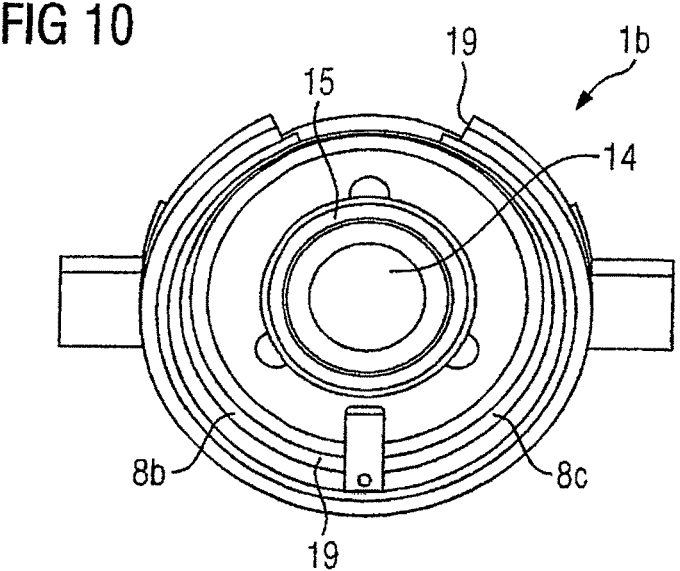
Figure 11:
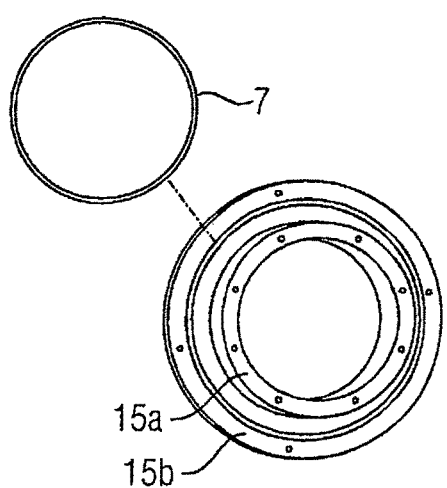

On the outlet side of the planetary gearbox, the gearbox housing 1 is formed by a torque brace 1b, as shown in FIG. 10. This torque brace 1b is constructed in a cover-like form, and defines a central through-hole 14 for the sun gear 2. The central through-hole 14 is here provided in a ring insert 15, which is inserted into the torque brace 1b from the drive offtake side of the planetary gearbox, and is rigidly joined to the torque brace 1b. The ring insert 15 is L-shaped in cross-section, and has a radial limb 15a and an axial limb 15b. The radial limb 15a of the ring insert 15 faces towards the side face 4b, on the drive offtake side of the planet gear carrier 4, and together with it forms a defined radial gap. This ensures that the ring insert 15 cannot take on any bearing function for the planet gear carrier 4.

On its surface which faces towards the interior of the gearbox housing 1, the radial limb 15a of the ring insert 15 carries an axial sliding bearing 7 in the form of a slipring, by which the planet gear carrier 4 is supported axially against the torque brace 1b. Radially, the planet gear carrier 4 is supported on and has a bearing mounting on the torque brace 1b by a segmented radial sliding bearing 8 which incorporates three radial sliding bearing segments 8a, 8b, 8c, arranged with spaces between them in the circumferential direction. Here, the support is effected on the outer perimeter of the planet gear carrier 4, i.e. at a position which is located radially outside the planetary gear pins 11. For clarification, the drawing has marked in it a perimeter circle U, on which lie the radially outermost points of the planet gear carrier axed 11. It can be clearly seen that the radial sliding bearing 8 supports the planet gear carrier 4 radially outside this circle U.

Figure 12:
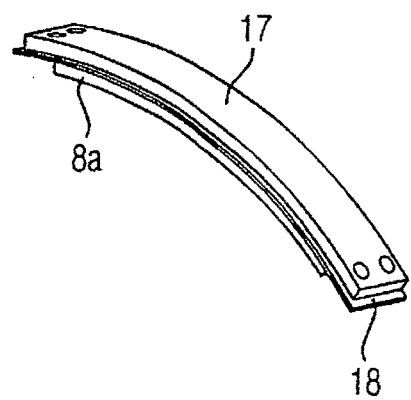
Figure 13:
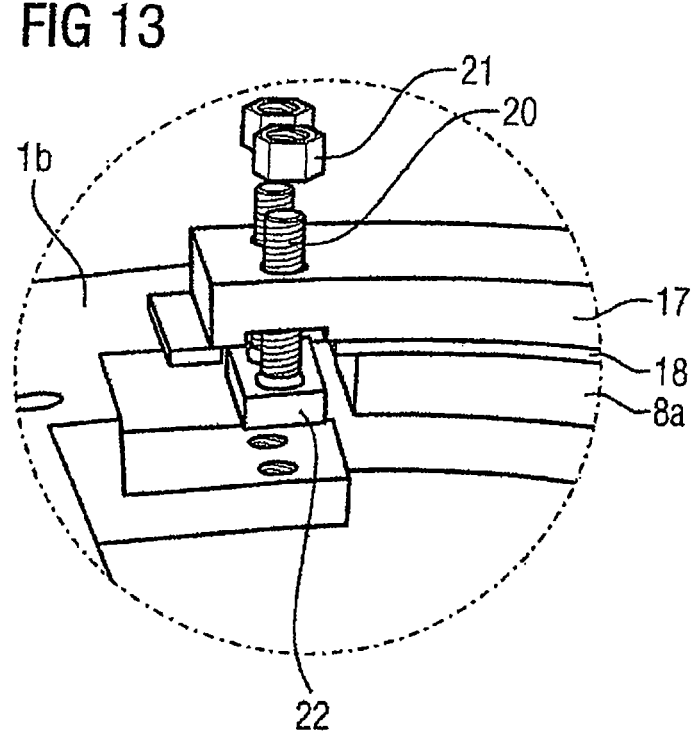

The radial sliding bearing segments 8a, 8b, 8c, of the radial sliding bearing 8 are mounted on the outer side of the torque brace 1b. For this purpose, each of the radial sliding bearing segments 8a, 8b, 8c is mounted on the radially inner side of an associated carrier plate 17, which is rigidly bolted (e.g. bolts 20 and nuts 21, FIG. 13) to the outer side of the gearbox housing 1. As can clearly be seen, in particular from FIG. 12, a sealing plate 18 is provided between the carrier plate 17 and the associated radial sliding bearing segments 8a, 8b, 8c. The arrangement thus made is such that the radial sliding bearing segments 8a, 8b, 8c protrude inwards through radial through-holes 19 in the torque brace 1b, in order to mate with the planet gear carrier 4. What is not shown is that the position of the radial sliding bearing segments 8a, 8b, 8c, can be adjusted, in particular in a radial direction, relative to the gearbox housing 1, to which end appropriate adjustment facilities are provided. An adjustment facility is shown by way of example in FIG. 13 which depicts the use of a washer 22 to alter the radial position of radial sliding bearing segment 8a for example.

Also not shown is the fact that the gearbox housing 1 is connected via an oil line which runs externally to an oil circulation pump, which sucks oil from the oil sump located in the gearbox housing 1 and feeds it back under pressure, after filtration and if necessary cooling, into the gearbox housing 1. For this purpose, the oil line is connected to an oil inlet on the gearbox housing 1, and there are oil guide channels, formed in the components of the planetary gearbox, through which lubricating oil is fed continuously, in particular, to the sliding bearings 5, 6, 7, 8 and the planet gear bearings. Oil channels are also formed in the planetary gear pins 11, so that these constantly have a flow of lubricating oil through them and are cooled. In respect of the concrete embodiment, refer to the applicant's DE 10 260 132 A1.

Although the invention has been illustrated and described in closer detail by the preferred exemplary embodiment, the invention is not limited to the examples disclosed, and further variations can be derived from it by a specialist without going outside the scope of protection of the invention.

The invention claimed is:

1. A planetary gearbox comprising:
   a gearbox housing;
   a central sunwheel mounted in the gearbox housing for rotation about a central gearbox axis and having outer teeth;
   a ringwheel arranged in concentric relationship to the central gearbox axis within the gearbox housing and having inner teeth;
   a planet gear carrier mounted in the gearbox housing for rotation about the central gearbox axis;
   a plurality of planet gears mounted on planet gear bearings on the planet gear carrier for rotation about corresponding planetary gear pins and having outer teeth meshing with the inner teeth on the ringwheel and the outer teeth of the sunwheel; and
   at least one segmented radial sliding bearing supporting the planet gear carrier on the gearbox housing, said segmented radial sliding bearing including a plurality of radial sliding bearing segments arranged in circumferentially spaced-apart relationship and positioned radially outside the planetary gear pins so that the planet gear carrier is supported by the radial sliding bearing at a position located radially outside the planetary gear pins,
   wherein the planet gear carrier is supported on the gearbox housing on axially opposite sides of the planet gears, with the segmented radial sliding bearing supporting the planet gear carrier on a drive offtake side of the planetary gearbox.

2. The planetary gearbox of claim 1, constructed for a wind turbine.

3. The planetary gearbox of claim 1, further comprising an adjustment mechanism configured to adjust the position of the radial sliding bearing segments relative to the gearbox housing.

4. The planetary gearbox of claim 3, wherein the adjustment mechanism is configured to adjust the position of the radial sliding bearing segments relative to the gearbox housing in a radial direction.

5. The planetary gearbox of claim 1, wherein the radial sliding bearing segments are provided on a component of the gearbox housing constructed as a torque brace.

6. The planetary gearbox of claim 1, wherein the radial sliding bearing segments are constructed and/or positioned so as to also support the planet gear carrier axially relative to the gearbox housing.

7. The planetary gearbox of claim 1, further comprising a further segmented radial sliding bearing to support the planet gear carrier on the gearbox housing on a drive input side of the planetary gearbox, said further segmented radial sliding bearing including a plurality of radial sliding bearing segments arranged in circumferentially spaced-apart relationship.

8. The planetary gearbox of claim 7, wherein the radial sliding bearing segments of the further segmented radial sliding bearing are mounted on the gearbox housing.

9. The planetary gearbox of claim 8, further comprising carrier plates configured to secure the radial sliding bearing segments of the further segmented radial sliding bearing on the gearbox housing.

10. The planetary gearbox of claim 7, further comprising a cover, said radial sliding bearing segments of the further segmented radial sliding bearing being mounted on the cover.

11. The planetary gearbox of claim 1, further comprising an axial sliding bearing supporting the planet gear carrier on the gearbox housing on the drive input side of the planetary gearbox.

12. The planetary gearbox of claim 11, wherein the axial sliding bearing is an axial slip ring.

13. The planetary gearbox of claim 11, further comprising a ring element inserted into the gearbox housing and configured to hold the axial sliding bearing.

14. The planetary gearbox of claim 13, wherein the ring element is inserted into a cover of the gearbox housing.

15. A planetary gearbox comprising:
    a gearbox housing;
    a central sunwheel mounted in the gearbox housing for rotation about a central gearbox axis and having outer teeth;
    a ringwheel arranged in concentric relationship to the central gearbox axis within the gearbox housing and having inner teeth;
    a planet gear carrier mounted in the gearbox housing for rotation about the central gearbox axis;
    a plurality of planet gears mounted on planet gear bearings on the planet pear carrier for rotation about corresponding planetary gear pins and having outer teeth meshing with the inner teeth on the ringwheel and the outer teeth of the sunwheel; and
    at least one segmented radial sliding bearing supporting the planet pear carrier on the gearbox housing, said segmented radial sliding bearing including a plurality of radial sliding bearing segments arranged in circumferentially spaced-apart relationship and positioned radially outside the planetary gear pins so that the planet gear carrier is supported by the radial sliding bearing at a position located radially outside the planetary gear pins,
    wherein the radial sliding bearing segments of the radial sliding bearing are mounted on an outer side of the gearbox housing and sized to protrude through radial or axial through-holes in the gearbox housing for contacting the planet gear carrier.

16. The planetary gearbox of claim 15, further comprising a carrier plate mounted onto an outer side of the gearbox housing, said radial sliding bearing segments of the radial sliding bearing being mounted radially on an inner side of the carrier plate.

17. The planetary gearbox of claim 16, wherein the carrier plate is rigidly bolted onto the outer side of the gearbox housing.

18. The planetary gearbox of claim 16, further comprising a sealing plate between the carrier plate and a corresponding one of the radial sliding bearing segments.

19. A planetary gearbox comprising:

a gearbox housing;

a central sunwheel mounted in the gearbox housing for rotation about a central gearbox axis and having outer teeth;

a ringwheel arranged in concentric relationship to the central gearbox axis within the gearbox housing and having inner teeth;

a planet gear carrier mounted in the gearbox housing for rotation about the central gearbox axis;

a plurality of planet gears mounted on planet gear bearings on the planet gear carrier for rotation about corresponding planetary gear pins and having outer teeth meshing with the inner teeth on the ringwheel and the outer teeth of the sunwheel;

at least one segmented radial sliding bearing supporting the planet gear carrier on the gearbox housing, said segmented radial sliding bearing including a plurality of radial sliding bearing segments arranged in circumferentially spaced-apart relationship and positioned radially outside the planetary gear pins so that the planet gear carrier is supported by the radial sliding bearing at a position located radially outside the planetary gear pins, and a ring insert inserted into the gearbox housing from a drive offtake side of the planetary gearbox and an axial sliding bearing configured to axially support the planet carrier on the insert ring.

20. The planetary gearbox of claim 19, wherein the ring insert is inserted into a component of the gearbox housing constructed as a torque brace.

21. The planetary gearbox of claim 19, wherein the insert ring has a limb which projects radially outwards, said axial sliding bearing configured to axially support the planet gear carrier on the limb of the ring insert.

22. The planetary gearbox of claim 19, wherein the axial sliding bearing is constructed as a slip ring.

* * * * *